US012799551B2

(12) United States Patent

Iwamoto et al.

(10) Patent No.: US 12,799,551 B2

(45) Date of Patent: Nov. 17, 2026

(54) STEEL FOIL FOR BATTERY CONTAINERS AND POUCH BATTERY CONTAINER PRODUCED FROM THE SAME

(71) Applicant: TOYO KOHAN CO., LTD., Tokyo (JP)

(72) Inventors: Nobuhiro Iwamoto, Yamaguchi (JP); Yasuyuki Ikeda, Yamaguchi (JP); Shinichi Takematsu, Yamaguchi (JP); Shinichirou Horie, Yamaguchi (JP); Koh Yoshioka, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 606 days.

(21) Appl. No.: 18/546,447

(22) PCT Filed: Jan. 27, 2022

(86) PCT No.: PCT/JP2022/003010

§ 371 (c)(1), (2) Date: Aug. 15, 2023

(87) PCT Pub. No.: WO2022/176553

PCT Pub. Date: Aug. 25, 2022

(65) Prior Publication Data

US 2024/0120581 A1 Apr. 11, 2024

(30) Foreign Application Priority Data

Feb. 19, 2021 (JP) ................................ 2021-025726

(51) Int. Cl.

*C21D 8/02* (2026.01)
*C21D 6/00* (2006.01)

(Continued)

(52) U.S. Cl.

CPC ............... *C21D 8/02* (2013.01); *C21D 6/005* (2013.01); *C21D 6/008* (2013.01); *C21D 8/0236* (2013.01);

(Continued)

(58) Field of Classification Search

None

See application file for complete search history.

(56) References Cited

U.S. PATENT DOCUMENTS

2006/0083981 A1 4/2006 Mori et al.
2015/0037684 A1* 2/2015 Ishizuka .................. C25D 5/36 72/47

(Continued)

FOREIGN PATENT DOCUMENTS

EP 1103638 A1 5/2001
JP 2001202932 A * 7/2001 ............ H01M 10/05

(Continued)

OTHER PUBLICATIONS

Yoshihisa—JP 2001-202932 A—Jap.Rej. D1—MT—package for battery—2001 (Year: 2001).*

*Primary Examiner* — John Vincent Lawler

(74) *Attorney, Agent, or Firm* — FisherBroyles, LLP; Roger L. Browdy; James E. Mrose

(57) ABSTRACT

The present invention provides steel foil for battery containers, the steel foil being characterized in that the maximum value of the maximum principal strain in uniaxial deformation is not less than 0.25 and the maximum value of the maximum principal strain in planar strain deformation is not less than 0.1. The present invention is able to provide steel foil for battery containers that is capable of restraining cracking of a base material when subjected to a severe forming process for battery containers.

10 Claims, 4 Drawing Sheets

(51) Int. Cl.

| | |
|---|---|
| ***C21D 8/0221*** | (2026.01) |
| ***C21D 8/0278*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***H01M 50/105*** | (2021.01) |
| ***H01M 50/119*** | (2021.01) |

(52) U.S. Cl.

CPC ............. *C21D 8/0278* (2013.01); *C21D 9/46* (2013.01); *C22C 38/002* (2013.01); *C22C 38/02* (2013.01); *C22C 38/04* (2013.01); *H01M 50/105* (2021.01); *H01M 50/119* (2021.01)

(56) References Cited

U.S. PATENT DOCUMENTS

| | | | | |
|---|---|---|---|---|
| 2017/0162836 | A1 | 6/2017 | Ibaragi et al. | |
| 2017/0170436 | A1 | 6/2017 | Ibaragi et al. | |
| 2018/0237882 | A1* | 8/2018 | Unno | B21B 1/22 |

FOREIGN PATENT DOCUMENTS

| | | | |
|---|---|---|---|
| JP | 2005-78894 | A | 3/2005 |
| WO | 2013157598 | A1 | 10/2013 |
| WO | 2016/013572 | A1 | 1/2016 |
| WO | 2016/013575 | A1 | 1/2016 |
| WO | 2020045627 | A1 | 3/2020 |

* cited by examiner

STEEL FOIL FOR BATTERY CONTAINERS AND POUCH BATTERY CONTAINER PRODUCED FROM THE SAME

TECHNICAL FIELD

The present invention relates to steel foil for battery containers suitable as a battery container of a lithium ion secondary battery or the like, and a pouch battery container produced from the same.

BACKGROUND ART

As a secondary battery to be mounted on a mobile electronic apparatus, a vehicle, or the like, a lithium ion secondary battery (hereinafter also called a "LiB") is widely known as a high-performance battery having a high output and a long life. Such a lithium ion secondary battery is mainly classified largely into a pouch type and a metallic can type. As an exterior material of the pouch type LiB, a body formed into a bag shape from a laminate material including metallic foil and a resin film is typically used. The pouch type LiB is advantageous in that it is light in weight, that the battery thickness can be reduced and thus it is high in heat radiating property, that the battery shape can freely be designed according to the apparatus shape, and so forth.

As the metallic foil in the laminate material used as the exterior material of the pouch type LiB, aluminum foil has widely been used owing to its lightness in weight. On the other hand, from the viewpoint of having strength, a steel foil-based exterior material for batteries has also been known. For example, PTL 1 discloses a technology of accommodating electrodes and the like in a pouch formed with use of a laminate metallic sheet obtained by laminating a thin metallic sheet with resin. In addition, PTL 1 also describes that iron or an iron alloy is used as a metallic foil core material.

In addition, PTL 2 and PTL 3 disclose a technology in which a rolled metallic sheet having a thickness of not more than 200 μm is subjected to Ni plating and then subjected to rolling and a heat treatment, whereby a diffused alloy layer containing Ni and Fe is formed on the surface of the rolled metallic sheet. In order to enhance corrosion resistance against an electrolyte or the like, a polyolefin-based resin may be formed on the rolled metallic sheet; in this connection, PTL 2 describes that the use of the diffused alloy layer enhances adhesion between the rolled metallic sheet and the polyolefin-based resin.

PTL 4 discloses a battery can in which the contents of carbon, manganese, phosphorus and the like contained in a steel sheet are defined, and a lustrous nickel layer is formed over an internal surface with a nickel-iron alloy layer and a non-lustrous or semi-lustrous nickel layer disposed therebetween, in order to produce a battery can having corrosion resistance against a strongly alkaline electrolyte.

CITATION LIST

Patent Literature

[PTL 1]
Japanese Patent Laid-open No. 2001-202932
[PTL 2]
PCT Patent Publication No. WO2016/013572
[PTL 3]
PCT Patent Publication No. WO2016/013575
[PTL 4]
Japanese Patent Laid-open No. 2005-078894

SUMMARY

Technical Problems

The above-described secondary battery that can be mounted on a vehicle or an electronic apparatus is demanded to also have a high capacity in addition to the high output. Here, in the case where it is sufficient to simply increase the capacity, it may be sufficient to accommodate appropriate electrode active materials in a relatively large container. However, particularly in a secondary battery to be mounted on a vehicle, an increase in weight of the battery itself immediately leads to worsening of fuel cost, and, hence, the increase in weight should be suppressed as much as possible even if the increase in weight is intended to realize a higher capacity.

As a technique for realizing a high capacity while avoiding an increase in weight as much as possible, it is presumed to increase the internal volume of the battery container by performing a forming process under more severe conditions. In other words, if the exterior material of the pouch type LiB can be produced by subjecting a thin laminate material to deep drawing or the like, it is possible to enhance the battery capacity while maximally securing the accommodating space for electrodes.

However, the conventional technologies including PTL 1 to PTL 4 cannot be said to be suitable for such a forming process, and there is much room for improvement.

Thus, in a metallic sheet for battery containers, excellent processability (formability) is very important for enhancing the competitive power of a product. It is an object of the present invention to solve the above-mentioned problem as an example. For example, it is an object of the present invention to provide steel foil for battery containers which is able to restrain cracking of a base material even in the case of forming a metallic sheet for battery use, and a pouch battery container produced from the same.

In addition, in the metallic sheet for battery containers, it is demanded to enhance resistance to the contents, particularly, to a non-aqueous electrolyte such as an organic electrolyte obtained by dissolving a lithium salt in an organic solvent. It is an object of the present disclosure to solve this problem as well; thus, it is an object of the present disclosure to provide steel foil for battery containers which is excellent in resistance to the contents, particularly, to a non-aqueous electrolyte placed inside the container, and a pouch battery container produced from the same.

Solution to Problems

To solve the above-described problems, steel foil for battery containers in an embodiment of the present invention is characterized in that (1) the maximum value of the maximum principal strain in uniaxial deformation is not less than 0.25 and the maximum value of the maximum principal strain in planar strain deformation is not less than 0.1.

In addition, in (1) above, it is preferable that (2) the steel foil for battery containers have a surface treatment layer formed on at least one surface thereof.

Besides, in (1) or (2) above, it is preferable that (3) the maximum value of the maximum principal strain in the uniaxial deformation be not less than 0.45 and the maximum value of the maximum principal strain in the planar strain deformation be not less than 0.2.

Further, in any one of (1) to (3) above, it is preferable that (4) the thickness of a base material be 10 to 200 μm.

Further, in any one of (1) to (4) above, it is preferable that (5) the maximum value of the maximum principal strain in equal biaxial deformation be not less than 0.2.

In (4) or (5) above, it is preferable that (6) the base material have a C content of not more than 0.15 wt %, a Si content of not more than 0.5 wt %, an Mn content of not more than 1.0 wt %, a P content of not more than 0.05 wt %, and an S content of not more than 0.02 wt %.

In any one of (4) to (6) above, it is preferable that (7) the base material have a C content of not more than 0.05 wt %.

In any one of (4) to (7) above, it is preferable that (8) the base material have an Nb content of not more than 0.05 wt % or a Ti content of not more than 0.1 wt %.

In any one of (1) to (8) above, it is preferable that (9) the surface treatment layer be either an Ni plating layer in an amount of 0.5 to 50.0 $g/m^2$ or a Cr plating layer in an amount of 0.05 to 10.0 $g/m^2$.

In any one of (1) to (9) above, it is preferable that (10) the steel foil have a thermoplastic resin layer formed on at least one surface thereof.

In addition, to solve the above-described problems, a pouch battery container in an embodiment of the present invention is characterized in that (11) the pouch battery container is obtained by heat sealing the steel foil for battery containers according to any one of (1) to (10) above. Besides, in the (11) above, it is preferable that (12) the pouch battery container be for non-aqueous batteries.

Advantageous Effects of Invention

According to the present invention, it is possible to realize steel foil for battery containers which is able to endure a severe forming process even though being thin as a material for battery containers and which is excellent in resistance to the contents, particularly, a non-aqueous electrolyte placed inside the container.

BRIEF DESCRIPTION OF DRAWING

FIG. 1(*b*) is a schematic diagram depicting the steel foil for battery containers 10 according to the present embodiment.

FIG. 2(*b*) is a schematic diagram depicting a forming limit line of the steel foil for battery containers 10 according to the present embodiment.

DESCRIPTION OF EMBODIMENT

Steel foil for battery containers 10 of the present embodiment will be described below with reference to FIG. 1. Note that, in FIG. 1, for the sake of convenience, the thickness direction of the steel foil for battery containers 10 is a Z direction, and further, the rolling direction of the steel foil for battery containers 10 is an X direction in the description. However, the definition of these directions is not intended to reduce the scope of right of the present invention.

<Steel Foil for Battery Containers>

Figure 1A:
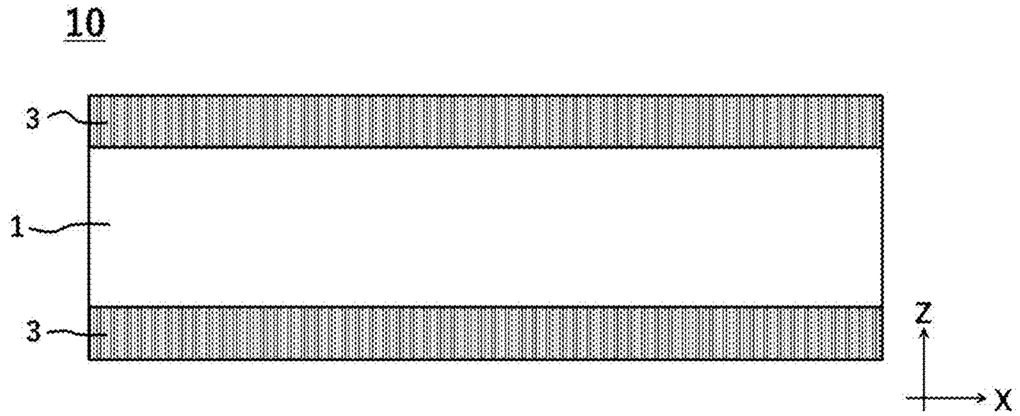
FIG. 1(*a*) is a schematic diagram depicting steel foil for battery containers 10 according to the present embodiment.
Figure 1B:
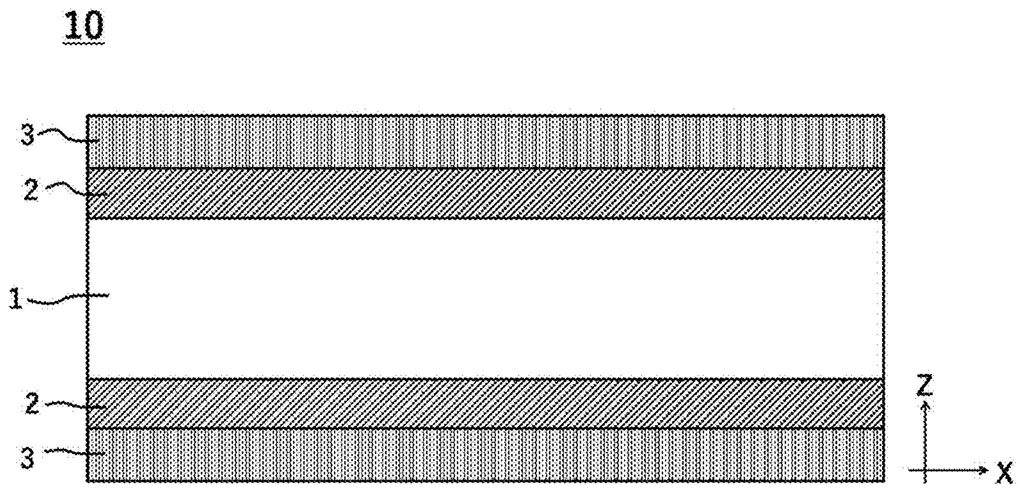

The steel foil for battery containers 10 according to the present embodiment has a base material 1 including steel foil as depicted in FIG. 1.

As the base material 1, various kinds of steel foil applicable as a base material for battery containers and the like can be exemplified. For example, as carbon steel, low carbon aluminum killed steel (carbon content: 0.01 to 0.15 wt %), ultra low carbon steel having a carbon content of not more than 0.003 wt %, or non-ageable ultra low carbon steel obtained by further adding Ti and/or Nb to the ultra low carbon steel, for example, are applicable.

The steel foil for battery containers 10 according to the present embodiment is characterized in that the maximum value of the maximum principal strain in uniaxial deformation is not less than 0.25 and the maximum value of the maximum principal strain in planar strain deformation is not less than 0.1. The above-mentioned characteristics will be described below.

In the present invention, it is an object to provide steel foil from which battery containers can be produced by such processing as deep drawing. Further, it is a challenge to provide steel foil for battery containers which is capable of reducing as much as possible both radii of curvature of Rc at four corners of a recess and Rp between side walls and a bottom surface of the recess, in producing a battery container having the recess by rectangular tube drawing.

This is based on the viewpoints of, for example, more enlargement of the area where electrodes are disposed in a battery container obtained, and, further, a reduction of dead space inside the battery.

The present inventors made extensive and intensive studies for solving the above-mentioned problem, and, as a result, found out that the above problem can be solved by defining strains in consideration of deformation modes at the time of forming the steel foil for battery containers. Specifically, they found out that, by defining the maximum value of the maximum principal strain in uniaxial deformation and the maximum value of the maximum principal strain in planar strain deformation of the steel foil for battery containers, a preferable electric container can be produced while cracking or the like is restrained even in the case of performing such processing as deep drawing.

The present inventors made detailed studies of rectangular tube drawing typically used for a pouch LiB exterior material, for enhancing formability in steel foil for battery containers. As a result, it was found out that the deformation mode was different from part to part at the time of forming in this forming method.

Figure 2A:
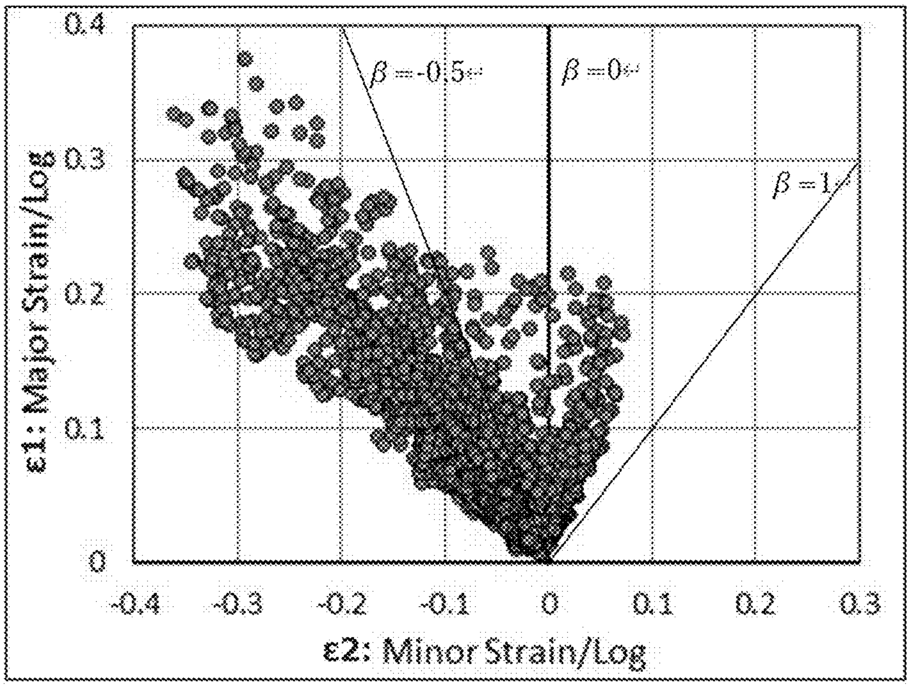
FIG. 2(*a*) is a schematic diagram depicting strain distribution in the steel foil for battery containers 10 according to the present embodiment.
Figure 2B:
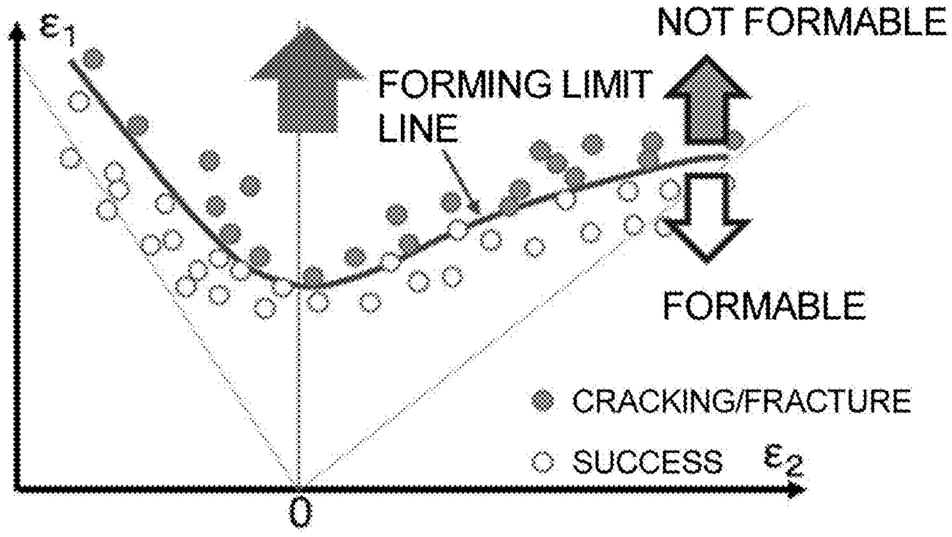

In other words, dots with a diameter of 0.5 mm were printed on steel foil for battery containers that has not yet been subjected to rectangular tube drawing, at a dot center interval of 1.0 mm. After the rectangular tube drawing, spreading between the dots on the formed body obtained was observed with use of a three-dimensional strain measuring system (ARGUS) made by Carl Zeiss GOM Metrology GmbH, to thereby observe the deformation mode. FIG. 2(*a*) is a diagram depicting one example of strain distribution in which strains on the formed body obtained are plotted. It is depicted that, in a rectangular tube drawn body, planar strain deformation and uniaxial deformation regions are major. From this observation result, the present inventors have considered that deep drawing formability of, for example, rectangular tube drawing can be enhanced by enhancing ability of planar strain deformation and uniaxial deformation.

Further, the present inventors repeated the above forming by varying the kind of steel of the base material 1 used, to thereby observe variations in the forming limit line (FIG. 2(*b*)) depending on the difference in the kind of steel. As a result, it has been verified that the forming limit line and the formable region are varied according to the carbon content of steel and differences in heat treatment conditions after rolling of the steel foil.

Then, the present inventors found out that preferable formability can be realized in producing a target high-capacity pouch LiB exterior material, by setting the planar strain deformation and the uniaxial deformation of the steel foil for battery containers to predetermined values.

Note that, as a method for measuring strain in the present embodiment, a known method can be applied. For example, in the strain distribution as depicted in FIG. 2 which is obtained at a timing immediately prior to occurrence of cracking when a specimen is deformed, the axis of ordinates represents the maximum principal strain ($\varepsilon 1$), the axis of abscissas represents the minimum principal strain ($\varepsilon 2$), in-plane strain ratio $\beta$ is made to be $\varepsilon 2/\varepsilon 1$, $-0.5 \leq \beta < 0$ is made to be a uniaxial deformation region, $\beta = 0$ is made to be a planar strain deformation region, and a region of $0 < \beta 1 \leq 1$ is made to be a biaxial deformation region, whereby the maximum value of the maximum principal strain in uniaxial deformation and the maximum value of the maximum principal strain in planar strain deformation can be obtained.

When the maximum value of the maximum principal strain in the uniaxial deformation and the maximum value of the maximum principal strain in the planar strain deformation of the steel foil for battery containers are set to the above-mentioned values, forming can be conducted preferably without occurrence of cracking, in production of a formed body having a rectangular recess by drawing steel foil having a thickness of 10 to 200 μm, even if the radius of curvature Rc at four corners, the radius of curvature Rp between side walls of the recess and a bottom surface of the recess, and the depth D of the recess are set to be not less than predetermined conditions. Note that each of the radius of curvature Rc at the four corners, the radius of curvature Rp between the side walls of the recess and the bottom surface of the recess, and the depth D of the recess will be described later.

In the steel foil for battery containers in the present embodiment, it is further preferable from the above-mentioned viewpoint that the maximum value of the maximum principal strain in the uniaxial deformation be not less than 0.45 and the maximum value of the maximum principal strain in the planar strain deformation be not less than 0.2.

The thickness of the base material 1 in the present embodiment is preferably 10 to 200 μm, more preferably 25 to 100 μm. If the thickness is less than 10 μm, quality would be instable due to generation of pinholes or instable tolerance of plate thickness in a cold rolling step. In addition, cracking would be generated in the forming step, making it unlikely to obtain the effect intended in the present application. On the other hand, if the thickness exceeds 200 μm, it may be impossible to achieve the object of making the battery container light.

Here, one example of the composition of the base material 1 will be illustrated below.

(C: 0.0001 to 0.15 Wt %)

C is an element that enhances strength of the base material 1. If the C content is excessive, the strength would be too raised, and rollability would be lowered; thus, the upper limit for the C content is 0.15 wt %. On the other hand, the lower limit for the C content is not particularly limited to any value, but, taking the cost into consideration, the lower limit for the C content is 0.0001 wt %. Note that the C content is more preferably 0.0005 to 0.05 wt %, and further preferably 0.001 to 0.01 wt %.

(Si: 0.001 to 0.5 Wt %)

Si is an element that enhances strength of the base material 1. If the Si content is excessive, the strength is too raised, and rollability would be lowered; thus, the upper limit for the Si content is 0.5 wt %. On the other hand, the lower limit for the Si content is not particularly limited to any value, but, taking the cost into consideration, the lower limit for the Si content is 0.001 wt %. Note that the Si content is more preferably 0.001 to 0.02 wt %.

(Mn: 0.01 to 1.0 Wt %)

Mn is an element that enhances strength of the base material 1. If the Mn content is excessive, the strength is too raised, and rollability would be lowered; thus, the upper limit for the Mn content is 1.0 wt %. On the other hand, the lower limit for the Mn content is not particularly limited to any value, but, taking the cost into consideration, the lower limit for the Mn content is 0.01 wt %. Note that the Mn content is more preferably 0.01 to 0.5 wt %.

(P: 0.001 to 0.05 Wt %)

P is an element that enhances strength of the base material 1. If the P content is excessive, the strength is too raised, and rollability would be lowered; thus, the upper limit for the P content is 0.05 wt %. On the other hand, the lower limit for the P content is not particularly limited to any value, but, taking the cost into consideration, the lower limit for the P content is 0.001 wt %. Note that the P content is more preferably 0.001 to 0.02 wt %.

(S: 0.0001 to 0.02 Wt %)

S is an element that lowers corrosion resistance of the base material 1. Hence, a lower S content is more preferable. Particularly, if the S content exceeds 0.02 wt %, lowering in the corrosion resistance becomes conspicuous; thus, the upper limit for the S content is 0.02 wt %. On the other hand, the lower limit for the S content is not particularly limited to any value, but, taking the cost into consideration, the lower limit for the S content is 0.0001 wt %. Note that the S content is more preferably 0.001 to 0.01 wt %.

(Al: 0.0005 to 0.20 Wt %)

Al is added, for example, as a deoxidizing element for the base material 1. For obtaining the effect of deoxidation, the Al content is preferably not less than 0.0005 wt %. However, since rollability would be lowered if the Al content is excessive, the upper limit for the Al content is 0.20 wt %. On the other hand, the lower limit for the Al content is not particularly limited to any value, but, taking the cost into consideration, the lower limit of the Al content is 0.0005 wt %. Note that the Al content is more preferably 0.001 to 0.10 wt %.

(N: 0.0001 to 0.0040 Wt %)

N is an element that lowers processability of the base material 1. Thus, a lower N content is more preferable. Particularly, since lowering in the processability becomes conspicuous if the N content exceeds 0.0040 wt %, the upper limit for the N content is 0.0040 wt %. On the other hand, the lower limit for the N content is not particularly limited to any value, but, taking the cost into consideration, the lower limit for the N content is 0.0001 wt %. Note that the N content is more preferably 0.001 to 0.0040 wt %.

(Remnant: Fe and Unavoidable Impurities)

A principal element of the remnant of the base material 1 is Fe, and the others are impurities that would unavoidably mix in at the time of production of the base material 1.

Other than the above-mentioned elements, the base material 1 may contain Ti, Nb, B, Cu, Ni, Sn, and Cr, for example, as additive components. Particularly, Ti and Nb have an effect of fixing C and N in the base material 1 as carbides and nitrides to thereby enhance processability of the base material 1. Thus, in the case where the C content is 0.001 to 0.01 wt %, the base material 1 may contain one or two of 0.01 to 0.1 wt % of Ti and 0.001 to 0.05 wt % of Nb. In addition, the base material 1 according to the present embodiment is more preferably a steel sheet containing less than 10.5% of Cr.

Note that it is preferable that the base material 1 according to the present embodiment be annealed after cold rolling, to thereby acquire at least one of the following characteristic properties. Note that the temperature and time necessary for annealing of the base material 1 in the present embodiment are a temperature of not less than 500° C. but less than 750° C. and a time of 5 to 15 hours and a temperature of 750° C. to 900° C. and a time of 5 seconds to 30 minutes, as illustrated in Table 1. More preferable temperature and time are a temperature of not less than 600° C. but less than 750° C. and a time of 6 to 10 hours and a temperature of 750° C. to 900° C. and a time of 10 seconds to 5 minutes.

to "20: formula (7) for determination of percentage elongation after fracture A" of "metallic materials tensile testing method" described in JIS 22241.

Note that, as will be described later, from the viewpoint of restraining cracking of the base material 1 during forming and exfoliation of a resin film from the base material 1, the elongation of the base material 1 is preferably not less than 20%, and, further, more desirably not less than 30%.

<Surface Treatment Layer>

In the steel foil for battery containers 10 according to the present embodiment, it is preferable that a surface treatment layer 2 (hereinafter also called a plating layer) be formed on at least one surface of the above-described base material 1.

The surface on which to form the surface treatment layer 2 is preferably a surface to be located on the internal surface side of the battery container.

Note that, also in regard of that surface of the steel foil for battery containers 10 which is to be located on the external surface side of the battery container, from the viewpoints of prevention of oxidation and establishment of easiness of production and the like, a surface treatment layer 2 which is the same as that on the surface to be located on the internal surface side as a whole or in at least one layer may be formed.

The surface treatment layer 2 is preferably a plating layer formed by electroplating. Specific examples of the surface treatment layer 2 include a Cr plating layer, an Ni plating

TABLE 1

| | | Soaking temperature (° C.) | | | | | | | |
|---|---|---|---|---|---|---|---|---|---|
| | | 500 or more | 550 or more | 600 or more | 650 or more | 700 or more | 750 or more | 800 or more | 850 to 900 |
| Heat treatment time (h) | Preferable range | 5 to 15 hours | | | | | 5 seconds to 30 minutes | | |
| | More preferable range | | | 6 to 10 hours | | | 10 seconds to 5 minutes | | |

(Tensile Strength)

Tensile strength of the base material 1 according to the present embodiment is preferably 260 to 700 Mpa. If the tensile strength is less than 260 Mpa, the base material 1 would be deformed by an external force when used as a battery container, thereby generating a crack or a hole, whereby leakage of electrolyte or the like would occur. Further, if the tensile strength exceeds 700 Mpa, processability would be poor. Note that the tensile strength of the base material 1 is more preferably 270 to 650 Mpa. In the case where more processability is required, the tensile strength is further preferably 280 to 450 Mpa.

Note that the tensile strength of the base material 1 in the present embodiment is a numerical value obtained according to the "metallic materials tensile testing method" described in JIS 22241.

(Elongation)

Elongation of the base material 1 according to the present embodiment is preferably 5% to 55%. If the elongation of the base material 1 is less than 5%, processability would be poor at corners, and cracking may occur during processing. Further, if the elongation exceeds 55%, a high temperature and a long time are required as annealing conditions for obtaining such a characteristic property, which leads to poor productivity. Note that the elongation of the base material 1 is more preferably 15% to 55%, and further preferably 20% to 50%.

Note that the elongation of the base material 1 in the present embodiment is a numerical value obtained according layer, and an Ni alloy plating exemplified by an Fe—Ni alloy plating layer. In addition, a plurality of these plating layers may be provided; for example, a Cr plating layer may be formed after an Ni plating layer is formed on the base material 1.

With the plating layer as described above formed on at least one surface of the base material 1, for example, adhesion to a resin film that is to be formed further on the plating layer can be enhanced. In addition, even in the case where a defect should occur in the resin film, resistance to corrosion by electrolyte can be secured.

Note that the surface treatment layer 2 in the present embodiment may be formed, for example, after annealing conducted after cold rolling of the base material 1, or may be formed after the cold rolling of the base material 1 but before the annealing of the base material 1. In the case where the Ni plating is conducted before the annealing of the base material 1, an Fe—Ni diffusion layer may be formed by a heat treatment. In this instance, the Fe—Ni diffusion layer may be formed between the Ni plating layer and the base material 1, or iron (Fe) of the base material 1 may diffuse into the whole of the Ni plating layer to form the Fe—Ni diffusion layer directly on the base material 1. As heat treatment conditions, a temperature and a time similar to those in the above-described annealing of the base material 1 can be set as preferable ranges.

In addition, while the surface treatment layers 2 are formed on both surfaces of the base material 1 in FIG. 1(*b*), there may also be adopted a mode in which the surface treatment layer 2 is formed at least on a surface to be located on the internal surface side of the battery container.

Alternatively, different kinds of surface treatment layers 2 (electroplating layers) may be formed respectively on both surfaces of the base material 1. For example, an electroplating layer (first electroplating layer) including at least one of an Ni plating layer and a Cr plating layer may be formed on that surface of the base material 1 which is to be located on the internal surface side of the battery container, and an electroplating layer (second electroplating layer) including a Zn plating layer or a Zn alloy plating layer (for example, Zn—Ni, Zn—Co, Zn—Co—Mo, Zn—Fe, Zn—Sn, or the like) of a different corrosion resisting mechanism (as a sacrificial protection layer) may be formed on that surface of the base material 1 which is to be located on the external surface side of the battery container. In this case, the electroplating layer including the Zn plating layer or the Zn alloy plating layer as the sacrificial protection-proofing layer is, for example, such that Zn is preferably in a plating amount of 3 to 30 $g/m^2$, more preferably in a plating amount of 5 to 25 $g/m^2$. Since Zn plating is dissolved in electrolyte, the Zn plating cannot be used on the side of the internal surface constantly in contact with the electrolyte, but can be used on the external surface side of the battery container, and is effective as sacrificial protection in the case where a small amount of the electrolyte is deposited. Particularly, when a small amount of the electrolyte is deposited on an end face, in the case where a Zn plating is formed on one surface (external surface side) as described above, Zn is dissolved preferentially on the end face, whereby corrosion of iron constituting the base material can be restrained, and leakage of the electrolyte can thereby be prevented, which is effective.

Note that, in the case of applying Ni plating as the surface treatment layer 2 onto the base material 1, after a cold rolled metallic sheet is subjected to electrolytic degreasing and pickling by ordinary methods, an Ni plating bath illustrated below can be used, for example. Note that a nickel sulfate bath called Watts bath is mainly used as the Ni plating bath, but other kinds of bath such as a sulfamic acid bath, a borofluoride bath, and a chloride bath may also be used.

One Example of Ni Plating Bath Composition and Conditions

Nickel sulfate: 200 to 350 g/l
Nickel chloride: 20 to 60 g/l
Boric acid: 10 to 50 g/l
pH: 1.5 to 5.0
Bath temperature: 40 to 70° C.
Current density: 1 to 40 $A/dm^2$ In addition, the Ni plating as the surface treatment layer 2 formed on the base material 1 is not limited to a plating of pure Ni, and may be a plating formed with use of an Ni-containing alloy such as an Ni—Co alloy or an Fe—Ni alloy.

In other words, the "Ni plating layer" in the present specification includes a "layer composed of an Ni-containing alloy" in addition to a "layer composed only of Ni," unless specified otherwise. Besides, the "layer composed of an Ni-containing alloy" may be a "diffusion layer in which Ni and metal other than Ni are mutually diffused," or may be an "alloy plating layer in which Ni and metal other than Ni are co-electrodeposited."

Similarly, the "Cr plating layer" in the present specification includes a "layer composed of a Cr-containing alloy" in addition to a "layer composed only of Cr," unless specified otherwise. In addition, the "layer composed of a Cr-containing alloy" may be a "diffusion layer in which Cr and metal other than Cr are mutually diffused," or may be an "alloy plating layer in which Cr and metal other than Cr are co-electrodeposited." Further, the "Cr plating layer" also includes what is generally called chromate treatment of forming a hydrated chromium oxide on the surface to be treated.

Also in the case where the surface treatment layer contains elements other than Ni and Cr, an understanding similar to the above-described can be made.

In other words, the surface treatment layer 2 may include one of an Ni plating layer composed only of Ni, an Fe—Ni diffusion layer in which Fe is diffused, and an Fe—Ni alloy plating layer in which Fe and Ni are co-electrodeposited. Note that "composed only of Ni" in the present specification means containing only Ni as a metallic element, but it is permitted to contain substances derived from additives in the plating bath or impurities unavoidably mixed in in the plating forming process, such as less than 0.1% of carbon and less than 0.05% of sulfur.

In addition, the Ni plating as the surface treatment layer 2 in the present embodiment is preferably an Ni plating having a plating amount of 0.5 to 50.0 $g/m^2$. If the plating amount of the Ni plating is less than 0.5 $g/m^2$, surface coating is insufficient, and exposure of the base material increases extremely, causing a problem of insufficient resistance to the contents. On the other hand, if the plating amount of the Ni plating exceeds 50.0 $g/m^2$, the thickness of the plating layer increases, whereby the thickness of the steel foil for battery containers 10 is also increased, leading to an increase in weight. Besides, an increase in the plating treatment time or the plating amount would cause a problem of worsening of productivity or an increase in the production cost.

In addition, in the case where a heat treatment is conducted after the Ni plating is formed as the surface treatment layer 2 on the base material 1, an Fe—Ni diffusion layer can be formed. From the viewpoint of enhancing the processability, it is preferable that the Fe—Ni diffusion layer have a thickness of 0.2 to 3.0 μm.

Note that the thickness of the Fe—Ni diffusion layer can be determined, for example, by calculating a measured time from a time point at which the Fe intensity becomes 10% based on a saturation value thereof to a time point at which the Ni intensity, after exhibiting a maximum value thereof, becomes 10% based on the maximum value, with use of a high-frequency glow discharge spectroscopic analysis apparatus, and determining the thickness in reference to the calculated measured time.

In addition, in the case where Cr plating is applied as the surface treatment layer 2 on the base material 1, after a cold-rolled metallic sheet is subjected to electrolytic degreasing and pickling by ordinary methods, the following Cr plating bath can, for example, be used as an example.

One Example of Cr Plating Bath Composition and Conditions $CrO_3$: 30 to 200 g/l
NaF: 1 to 10 g/l
pH: not more than 1.0
Bath temperature: 35° C. to 65° C.
Current density: 5 to 50 $A/dm^2$ In this case, the Cr plating as the surface treatment layer 2 is preferably a Cr plating having a plating amount of 0.05 to 10.0 g/m$^2$. If the plating amount of the Cr plating is less than 0.05 g/m$^2$, surface coating is insufficient, and exposure of the base material 1 would be extremely increased, causing a problem of insufficient resistance to the contents. On the other hand, if the plating amount of the Cr plating exceeds 10.0 g/m$^2$, a problem of an increase in weight, worsening of productivity, or an increase in the production cost would be generated as described above.

Besides, in the case where Cr plating is applied as the surface treatment layer 2, it is more preferable that the Cr plating layer be such that the proportion of metallic Cr is greater than the proportion of hydrated Cr oxide (CrOx). Here, the metallic Cr and the hydrated Cr oxide (CrOx) can be calculated, for example, by the following method. First, as step 1, the total Cr amount of the Cr plating applied on the base material is measured. Next, as step 2, the base material subjected to Cr plating is subjected to a dissolving treatment in a high-temperature alkali, whereby the hydrated Cr oxide is dissolved, and the amount of Cr remaining on the base material is measured as the metallic Cr amount. Finally, as step 3, the hydrated Cr oxide amount is calculated (hydrated Cr oxide amount=total Cr amount−metallic Cr amount). Note that the above-mentioned measurements can all be performed by a commercial fluorescent X-ray measurement device.

Note that, in the present embodiment, the values measured for the base material formed with the surface treatment layer satisfies such a condition that the maximum value of the maximum principal strain in uniaxial deformation is not less than 0.25 and the maximum value of the maximum principal strain in planar strain deformation is not less than 0.1.

In addition, it is preferable that tensile strength and elongation also similarly satisfy the above-mentioned preferable ranges as the base material formed with the surface treatment layer.

<Thermoplastic Resin>

The steel foil for battery containers 10 according to the present embodiment may be coated with a thermoplastic resin layer 3 on at least one surface thereof, the coating layer preferably being provided on a surface to be located on the internal surface side of the battery container. Note that, in the steel foil for battery containers 10, the thermoplastic resin layer 3 may be formed on the above-described surface treatment layer 2.

In other words, the steel foil for battery containers 10 may be configured as a laminate plate in which the surface treatment layer 2 is coated thereon with the thermoplastic resin layer 3 (FIG. 1(*b*)), or may have a configuration in which the surface treatment layer 2 is simply formed, or further may have a configuration in which neither the surface treatment layer 2 nor the thermoplastic resin layer 3 is provided. Besides, the base material 1 may be coated thereon with the thermoplastic resin layer 3 without the surface treatment layer 2 therebetween (FIG. 1(*a*)).

The thickness of such a thermoplastic resin layer 3 is 10 to 100 μm, preferably 10 to 50 μm.

In addition, examples of the material for the thermoplastic resin layer 3 in the present embodiment include polyolefin-based resin, polyester-based resin, and polyamide resin. It is preferable that the polyolefin-based resin, the polyester-based resin, or the polyamide resin be coating both surfaces of the steel foil for battery containers 10. In this case, a surface on one side of the steel foil for battery containers 10 (the internal surface side of the battery can) is preferably coated with polyolefin-based resin (particularly, polypropylene resin).

As such polypropylene resin, various kinds of polypropylene resin such as random propylene resin, homopropylene resin, and block propylene resin may be used in a single layer, or may be used in a multilayer form by laying up the layers.

In addition, in the present embodiment, known additives may be added to the polypropylene resin. Examples of such additives include a low-crystalinity ethylene-butene copolymer, a low-crystalinity propylene-butene copolymer, a terpolymer composed of a three-component copolymer of ethylene, butene, and propylene, silica, zeolite, an anti-blocking agent such as acrylic resin beads, and a fatty acid amide-based slip agent. Further, for example, a slip agent (for enhancing physical stability of the material), an antioxidant and the like may also be added as the above-mentioned additives.

Meanwhile, a surface on the other side of the steel foil for battery containers 10 (the external surface side of the battery can) is preferably coated with one of polyester resin, polyamide resin, and polyolefin resin. Of these kinds of resin, the polyester resin for coating is preferably polyethylene terephthalate. Note that, as the polyester resin, for example, polybutylene terephthalate, polyethylene naphthalate, polybutylene naphthalate, and the like can be used, in addition to polyethylene terephthalate. Besides, modified resin such as urethane-modified polyester resin, acryl-modified polyester resin, and, epoxy-modified polyester resin may also be used.

Note that the thickness of the resin coating a surface on one side of the steel foil for battery containers 10 (for example, the internal surface side of the battery can) and the thickness of the resin coating a surface on the other side (for example, the external surface side) may appropriately be adjusted within the above-mentioned thickness range according to the required corrosion resistance and processability, and the thicknesses on both surfaces may be the same or different.

In addition, in the case where polyester resin is used, the polyester resin is preferably non-oriented.

Besides, the surface on the other side of the steel foil for battery containers 10 (the external surface side of the battery can) is coated with resin which is not limited to polyester resin (polyethylene terephthalate resin), and both surfaces of the steel foil for battery containers 10 may be coated with polypropylene resin. Alternatively, both surfaces of the steel foil for battery containers 10 may be coated with polyester resin.

In addition, the thermoplastic resin layer 3 may coat the steel foil for battery containers 10 with a known adhesive therebetween. Note that, as the known adhesive, there can be used, for example, inorganic adhesives such as an acid-modified polyolefin resin, an epoxy resin, an acrylic resin, a urethan resin, a silicone resin, a polyisobutylene resin, a fluororesin, water glass, or the like.

The thermoplastic resin layer 3 may be formed by lamination of a film, or may be formed by an extrusion lamination method in which the material resin of the thermoplastic resin layer 3 melted by heating is extruded into a film form through a slit having an extrusion width of an extrusion machine and is laminated directly on the base material 1 or on the surface treatment layer 2. In the case of laminating after forming the film, there is no particular limitation regarding presence or absence of orientation of the film; for example, a non-oriented film or a uniaxially oriented film or a biaxially oriented film may be adopted.

<Production Method for Steel Foil for Battery Containers>

Figure 3:
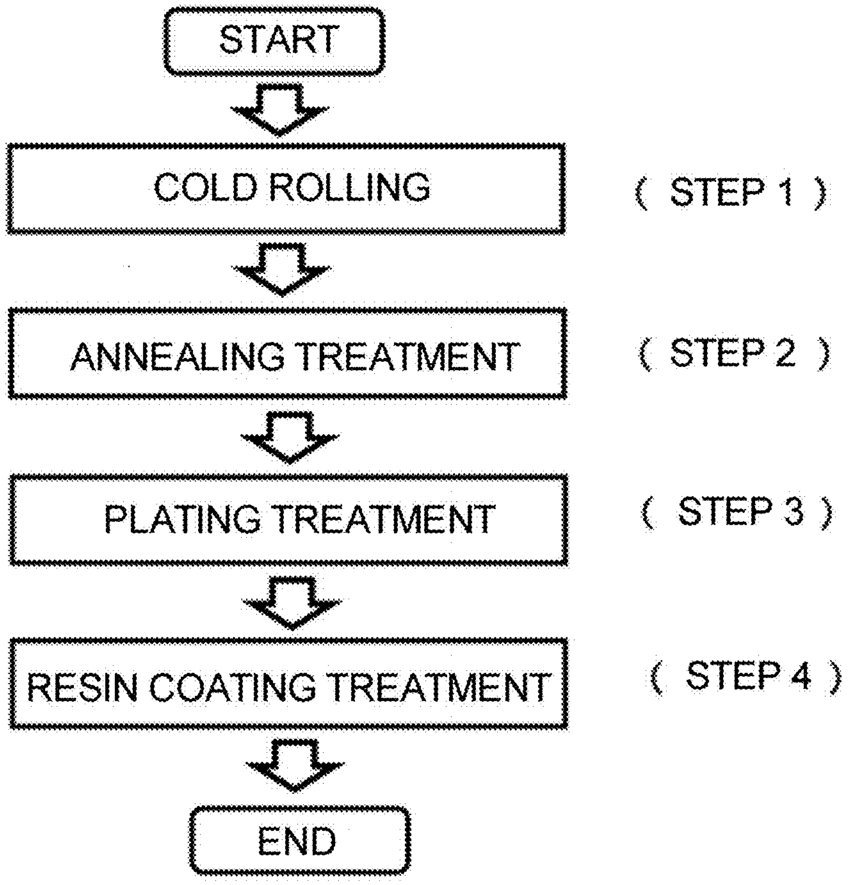
FIG. 3 is a diagram depicting one example of production process of the steel foil for battery containers 10 according to the present embodiment.

Next, a production method for the steel foil for battery containers 10 of the present embodiment will be described with reference to FIG. 3.

First, a steel sheet is prepared, and the steel sheet is put into a rolling mill to cold roll the steel sheet (step 1). As a result, cold-rolled steel foil (base material 1) having a thickness of 10 to 200 μm is formed. The cold rolling may be conducted in multiple stages as required, and a heat treatment may be performed between the stages.

Next, the base material 1 thus obtained is subjected to an annealing treatment (step 2). In this instance, the temperature of the base material 1 and time in the annealing treatment are a temperature of not less than 500° C. but less than 750° C. and a time of 5 to 15 hours, and a temperature of 750° C. to 900° C. and a time of 5 seconds to 30 minutes. More preferable temperature and time are a temperature of not less than 600° C. but less than 750° C. and a time of 6 to 10 hours; and a temperature of 750° C. to 900° C. and a time of 10 seconds to 5 minutes.

After step 2, the base material 1 is subjected to a surface treatment (plating treatment) to form the surface treatment layer 2 (electroplating layer) including at least one of an Ni plating layer and a Cr plating layer on at least a surface on one side of the base material 1 (step 3). Note that step 3 is not an indispensable step in the production method for the steel foil for battery containers 10 of the present embodiment, and may be omitted as required.

The surface treatment layer 2 (electroplating layer) formed in step 3 is preferably, for example, an Ni plating layer with a plating amount of 0.5 to 50.0 $g/m^2$ or a Cr plating layer with a plating amount of 0.05 to 10.0 $g/m^2$.

Note that the annealing in step 2 may be conducted after the surface treatment layer 2 is formed.

In addition, after the surface treatment layer 2 is formed after the annealing in step 2, a heat treatment (diffusion treatment) may further be conducted with the aim of enhancing processability, for example. The heat treatment conditions in this instance can be conditions similar to the annealing conditions described in the step 2.

Note that if the rolling step of step 1 is conducted after the plating treatment, cracking would occur in the surface of the plating film, and adhesion and corrosion resistance may be lowered, which is unfavorable.

It is preferable that the base material 1 having undergone step 2 or the base material 1 having undergone step 2 and step 3 have either one characteristic property of a tensile strength of 260 to 700 Mpa or an elongation of 5% to 55%.

Subsequently, in step 4, the base material 1 formed with the surface treatment layer 2 is subjected to a treatment (resin coating treatment) of coating with the thermoplastic resin layer 3 described above in a thickness on the order of 10 to 50 μm. Note that step 4 is not an indispensable step in the production method for the steel foil for battery containers 10 of the present embodiment, and may be omitted as required, in so far as the steel foil for battery containers 10 is not configured as a laminate plate (surface treated steel foil).

The thermoplastic resin layer 3 is preferably formed on at least that side of the base material 1 which is to be the internal surface side of the battery container, and the forming method may be film lamination or extrusion lamination. Note that the temperature of the base material 1 at the time of coating with the thermoplastic resin layer 3 is adjusted, for example, to a temperature of normal temperature to 280° C., preferably a temperature of not more than 250° C., according to the mode of lamination.

After conducting steps 1 to 4 as described above, the steel foil for battery containers 10 can be obtained.

<Battery Container>

Next, a battery container of the present embodiment which is produced from the steel foil for battery containers 10 will be described.

The battery container of the present embodiment is produced by subjecting the above-described steel foil for battery containers 10 to such processing as drawing and heat sealing. Besides, the battery container of the present embodiment preferably has what is generally called a pouch shape produced by rectangular tube drawing.

Figure 4:
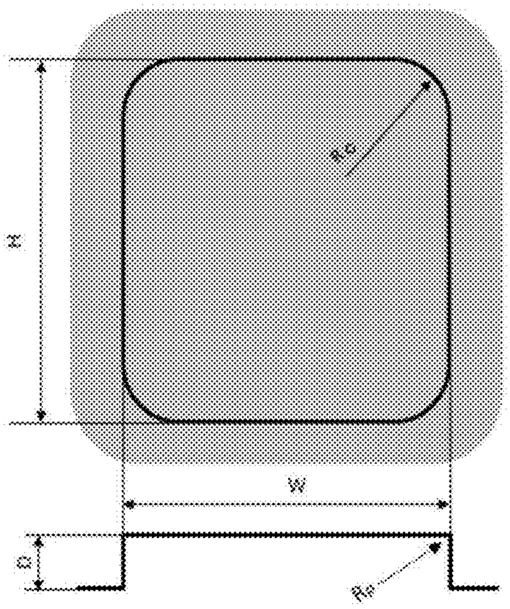
FIG. 4 is a diagram depicting one example of a shape of a battery container according to the present embodiment.

More in detail, the steel foil for battery containers 10 is subjected to a drawing step (deep drawing or the like) whereby the steel foil for battery containers 10 is formed into a container shape as depicted in FIG. 4. More specifically, the container shape in the present embodiment has a rectangular recess of a depth D which is formed with corner sections of a radius of curvature Rc (called Rc, since it is a radius of curvature at corners in the circumferential direction) such that a rectangular electrode plate can be accommodated therein. In addition, side surfaces of the recess and a bottom surface of the recess are connected to each other with a radius of curvature Rp (called Rp, since it is defined by the R of a punch). Note that, while the R values at the four corners of the above-described recess are equal in the container of FIG. 4, the Rc and the Rp may have different values.

Here, the reason why the steel foil for battery containers 10 of the present embodiment is very effective for the shape of the battery container having the shape of such radii of curvature Rc and Rp and the depth D will be described in detail below.

<Radii of Curvature Rc and Rp and Depth D for Higher Capacity>

First, in order to realize a higher capacity with use of the steel foil for battery containers 10 as a battery container, the Rc at the four corners of the recess, the Rp between the side surfaces of the recess and the bottom surface of the recess, and the depth D at the time of forming are all important, but, particularly, the balance between the Rp and the depth D is important. Note that establishing such a balance is particularly important for the battery container for vehicle use, since it is ideal that individual batteries are enlarged in size such that the battery characteristics of a plurality of conventional batteries can be secured by a single battery. Besides, establishing the balance is also important not only in the case of a single-cell battery but also in the case of a plurality of batteries assembled to be used as a module.

It is desired that both the radii of curvature Rc and Rp be as small as possible, from the viewpoints of more enlarging the area where the electrodes are disposed and reducing the dead space inside the battery and the like.

The value of such a radius of curvature Rp is preferably not more than 3 mm, more preferably not more than 1.5 mm, and further preferably not more than 1.0 mm.

In addition, the value of such a radius of curvature Rp, which varies depending on use and battery size, is preferably less than 10 mm, more preferably not more than 8 mm, and further preferably not more than 3 mm.

Meanwhile, for realizing a higher capacity in use as a battery container, increasing the depth D is also effective, since an increase in the number of electrodes accommodated in stack leads to an increase in the capacity of the battery as a whole. The value of such a depth D is preferably not less than 5 mm, more preferably not less than 6 mm, and further preferably not less than 10 mm.

Under such a background, the present inventors made extensive and intensive studies in regard of a desirable relation between the radius of curvature Rp and the depth D, and, as a result, concluded that, in the case where the steel foil for battery containers 10 is processed under the above-mentioned conditions for obtaining a higher capacity, there are challenges in formability and in resistance to the contents (resistance to the electrolyte) after forming.

In other words, first, as the radius of curvature Rp becomes smaller and smaller, the difficulty in forming increases, and, particularly, when the radius of curvature Rp is not more than 1.0 mm, the difficulty drastically increases. Further, in regard of the depth D, as deeper and deeper forming is intended to be performed, the more and more the processing conditions for the material of the steel foil for battery containers 10 become severe. Particularly, in the case where a specific condition of the radius of curvature Rp and a condition of the depth D are combined with each other in the steel foil having a thickness of 10 to 200 μm as that used in the present embodiment, the following two problems occur.

First, a first problem is that cracking is liable to occur during foaming. In the first place, in the case of using the steel foil as the base material 1 as described in the present embodiment, specific gravity is high as compared to that in a conventional case where aluminum is used as the base material, and, thus, the thickness of the base material 1 should be reduced in order to restrain an increase in the weight of the battery. When the thickness of the steel foil as the base material 1 is thus reduced, cracking of the base material 1 or the like is liable to occur.

Next, a second problem is resistance to the contents (resistance to the electrolyte) after forming. In the case where drawing is conducted under the severe processing conditions as described above, cracking of the resin film or the like may occur. Thus, the surface of the base material 1 should be in a form not easily dissolved, even in the case where cracking or the like should occur.

In regard of the first problem described in detail above, it has been found out that, in the battery container of the present embodiment, by setting the maximum value of the maximum principal strain in uniaxial deformation of the steel foil for battery containers to be not less than 0.25 and setting the maximum value of the maximum principal strain in planar strain deformation to be not less than 0.1, cracking can be restrained even in the case where drawing is conducted under the severe processing conditions as described above.

In addition, further in regard of the second problem, it has been found out that, by forming a surface treatment layer on at least one surface of the steel foil for battery containers, the base material can be restrained from being dissolved into the electrolyte even in the case where a defect should occur in the resin film. In this instance, in the case where the surface treatment layer is a surface treatment layer (electroplating layer) including at least one of not less than 0.5 $g/m^2$ of an Ni plating layer and not less than 0.05 $g/m^2$ of a Cr plating layer, sufficient resistance to the contents is obtained when used as a battery container, which is favorable.

Note that the battery container is sealed after accommodating battery elements such as electrode plates and the electrolyte, and the steel foil for battery containers 10 of the present embodiment can be applied also to a lid member of the battery container which is used for sealing. The lid member as a constituent member of such a battery container may be formed with an accommodating space similar to that of the battery container main body depicted in FIG. 4, or can be used as a flat sheet. In addition, in sealing the battery container, it is preferable that a flange section at the peripheral edge of the battery container main body having a draw formed accommodating section be heat sealed to the lid member. In this case, each coating resin on the mating surfaces of the battery container main body and the lid member are preferably configured such that resin of the same kind, such as polypropylene resin or polyester resin, face each other. Note that the above-described sealing method is a nonlimitative example, and, for example, a known adhesive may be used.

Since the battery container obtained in the present embodiment is formed with use of the above-described steel foil for battery containers 10 of the present embodiment, it can be preferably used as battery containers for various primary batteries or secondary batteries such as an alkali battery, a nickel hydrogen battery, a nickel-cadmium battery, and a lithium ion battery. Particularly, since the battery container of the present embodiment is excellent in resistance to electrolyte as described above, it can be preferably used for non-aqueous batteries accommodating electrolyte of an organic solvent as the contents.

EXAMPLES

Next, the present invention will be described more specifically by illustrating Examples.

Example 1

First, as steel foil to be a base material 1, a cold rolled sheet (thickness 50 μm) of low carbon steel having the following chemical composition was prepared. C: 0.04 wt %, Mn: 0.22 wt %, Si: 0.001 wt %, P: 0.01 wt %, S: 0.01 wt %, remnant: Fe and unavoidable impurities Next, the steel foil thus prepared was annealed at 750° C. for 10 seconds, whereby a base material 1 having the following characteristic properties was obtained.

Tensile strength (TS): 364 Mpa

Elongation (EL): 28.6%

(Measurement of Principal Strain)

For the base material 1 obtained as described above, the maximum principal strain in uniaxial deformation and the maximum principal strain in planar strain deformation were measured by the above-mentioned technique. Note that measurement of these maximum principal strains was conducted with use of a non-contact three-dimensional strain/displacement measuring system (ARAMIS) made by Carl Zeiss GOM Metrology GmbH. A sample preliminarily coated with a random pattern by spray or the like was used, the manner of deformation was successively imaged by two cameras to thereby perform triangulation, and the process of variation in the random pattern was acquired as three-dimensional position information, whereby the maximum principal strain (ε1) in sheet plane immediately prior to fracture and the minimum principal strain (ε2) orthogonal thereto were measured. Uniaxial deformation was conducted by tensile testing using a tensile testing machine with a JIS No. 5 specimen. For equal biaxial deformation and planar strain deformation, an Erichsen tester was used. For equal biaxial deformation, a circular blank of 150 mmϕ was used, and for planar strain deformation, a blank obtained by cutting away both ends of a circular blank such that the width becomes approximately 65 mm was used. A spherical head punch of 60 mmϕ was used, and, for reducing friction between the punch and the blank, forming was performed with vaseline applied to a tip part of the punch.

As a result of measurement, the maximum value of the maximum principal strain in uniaxial deformation of the base material 1 in the present example was 0.40. Similarly, the maximum value of the maximum principal strain in planar strain deformation was 0.14.

(Formation of Thermoplastic Resin Layer 3)

First, as a thermoplastic resin layer 3, a polyethylene film of a thickness of 50 μm (tradename "DAIWA PROTACK P-563B," made by Daiwa Fine Chemicals Co., Ltd.) was prepared. Next, the polyethylene films were stuck to both surfaces of the base material 1.

(Evaluation of Formability)

After a lubricating oil was applied to the steel foil for battery containers 10 coated with the thermoplastic resin layer 3 as above-described, deep drawing was conducted with use of a 50 mm×50 mm punch such that the above-mentioned recess is formed. Note that this deep drawing was carried out with Rc at the four corners of the recess being set to 3.0 mm and with Rp between the side walls and the bottom surface of the recess being set to 1.0 mm and 3.0 mm. Press forming was conducted until such abnormality as cracking and rupture occurred in the steel foil for battery containers 10, and the processing was stopped at the time when the abnormality occurred.

Note that the evaluation of formability for the steel foil for battery containers 10 obtained after the press forming was conducted by visual observation of cracking of the base material 1 at the four corners of the battery container and floating or cracking of the thermoplastic resin layer 3, according to the following criteria.

[Evaluation Criteria]

Excellent: The above-mentioned abnormality of the base material was not observed even when the forming depth exceeded 10 mm, both at Rp=1.0 mm and at Rp=3.0 mm.

Good: The above-mentioned abnormality of the base material was observed before the forming depth reached 5 mm, at either one of Rp=1.0 mm and Rp=3.0 mm, but the abnormality was not observed at the other.

Poor: Rupture and/or cracking was observed in the base material before the forming depth reached 5 mm, both at Rp=1.0 mm and at Rp=3.0 mm.

Example 2

A process similar to that in Example 1 was conducted except for the items described below.

First, as steel foil to be the base material 1, a cold rolled steel sheet (thickness 50 μm) of ultra low carbon steel having the following chemical composition was prepared.

C: 0.001 wt %, Mn: 0.30 wt %, Si: 0.01 wt %, P: 0.01 wt %, S: 0.01 wt %, Nb: 0.02 wt %, remnant: Fe and unavoidable impurities Next, the steel foil thus prepared was annealed at 670° C. for 8 hours, whereby a base material 1 having the following characteristic properties was obtained.

Tensile strength (TS): 340 Mpa

Elongation (EL): 23.7%

For the base material 1 obtained above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 in the present example was 0.27. Similarly, the maximum value of the maximum principal strain in planar strain deformation of the base material 1 was 0.23.

Example 3

A process similar to that in Example 1 was conducted except for the items described below.

First, as steel foil to be the base material 1, a cold rolled steel sheet (thickness 80 μm) of ultra low carbon steel having the following chemical composition was prepared.

C: 0.001 wt %, Mn: 0.15 wt %, Si: 0.01 wt %, P: 0.01 wt %, S: 0.01 wt %, Ti: 0.03 wt %, Nb: 0.004 wt %, remnant: Fe and unavoidable impurities Next, the steel foil thus prepared was annealed at 820° C. for 20 seconds, whereby a base material 1 having the following characteristic properties was obtained.

Tensile strength (TS): 301 Mpa

Elongation (EL): 42.0%

For the base material 1 obtained above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 in the present example was 0.65. Similarly, the maximum value of the maximum principal strain in planar strain deformation of the base material 1 was 0.30.

Example 4

With use of the same base material as that in Example 3, a process similar to that in Example 3 was conducted except for the items described below.

In other words, the steel foil prepared was annealed at 640° C. for 8 hours, whereby a base material 1 having the following characteristic properties was obtained.

Tensile strength (TS): 332 Mpa

Elongation (EL): 39.0%

For the base material 1 obtained above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 in the present example was 0.62. Similarly, the maximum value of the maximum principal strain in planar strain deformation of the base material 1 was 0.30.

Example 5

A process similar to that in Example 4 was conducted except that the thickness of a cold rolled sheet of ultra low carbon steel was set to 50 μm, as the steel foil to be the base material 1. For the base material 1 thus obtained, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 in the present example was 0.63. Similarly, the maximum value of the maximum principal strain in planar strain deformation of the base material 1 was 0.31.

Example 6

With use of the same cold rolled sheet of ultra low carbon steel as that in Example 5 as the base material 1, a surface treatment layer 2 was formed in the following procedure.

(Formation of Surface Treatment Layer 2)

After the base material 1 was subjected to electrolytic degreasing and pickling by immersion in sulfuric acid, electroplating was conducted under the following conditions, to form a surface treatment layer 2 (Ni electroplating layer) having an Ni plating amount of 4.5 g/$m^2$. Note that the forming conditions for the Ni plating layer were as follows.

(Forming Conditions for Ni Plating Layer)

Bath composition: nickel sulfate, nickel chloride, boric acid, pitting restraining agent pH: 4.3

Bath temperature: 55° C.

Current density: 10 A/$dm^2$

Subsequently, a heat treatment was conducted at 800° C. for 10 seconds, whereby a base material 1 formed with a surface treatment layer 2 having the following characteristic properties was obtained.

Tensile strength (TS): 325 Mpa

Elongation (EL): 37.3%

For the base material 1 formed with the surface treatment layer 2 obtained as above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 formed with the surface treatment layer 2 in the present example was 0.62. Similarly, the maximum value of the maximum principal strain in planar strain deformation of the base material 1 formed with the surface treatment layer 2 was 0.30.

For the base material 1 formed with the surface treatment layer 2, as in Example 1, both surfaces of the base material 1 were coated with a thermoplastic resin layer 3, after which evaluation of formability was conducted.

Example 7

As in Example 6 except that the heat treatment conditions were 800° C. and 30 seconds, a base material 1 formed with a surface treatment layer 2 having the following characteristic properties was obtained.

Tensile strength (TS): 326 Mpa

Elongation (EL): 35.6%

For the base material 1 formed with the surface treatment layer 2 obtained as above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 formed with the surface treatment layer 2 in the present example was 0.62. Similarly, the maximum value of the maximum principal strain in planar strain deformation of the base material 1 formed with the surface treatment layer 2 was 0.31.

Example 8

As in Example 6 except that the heat treatment conditions were 820° C. and 10 seconds, a base material 1 formed with a surface treatment layer 2 having the following characteristic properties was obtained.

Tensile strength (TS): 325 Mpa

Elongation (EL): 30.2%

For the base material 1 formed with the surface treatment layer 2 obtained as above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 formed with the surface treatment layer 2 in the present example was 0.52. Similarly, the maximum value of the maximum principal strain in planar strain deformation of the base material 1 formed with the surface treatment layer 2 was 0.26.

Example 9

As in Example 6 except that the heat treatment conditions were 850° C. and 10 seconds, a base material 1 formed with a surface treatment layer 2 having the following characteristic properties was obtained.

Tensile strength (TS): 339 Mpa

Elongation (EL): 30.7%

For the base material 1 formed with the surface treatment layer 2 obtained as above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 formed with the surface treatment layer 2 in the present example was 0.54. Similarly, the maximum value of the maximum principal strain in planar strain deformation of the base material 1 formed with the surface treatment layer 2 was 0.28.

Comparative Example 1

The same base material as that in Example 2 was used. A process similar to that in Example 2 was carried out except for the items described below.

Specifically, the steel foil thus prepared was annealed at 560° C. for 8 hours, whereby a base material 1 having the following characteristic properties was obtained.

Tensile strength (TS): 385 Mpa

Elongation (EL): 20.6%

For the base material 1 obtained as above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 in the present comparative example was 0.19. Similarly, the maximum value of the maximum principal strain in planar strain deformation of the base material 1 was 0.16.

Comparative Example 2

The same base material as that in Example 2 was used. A process similar to that in Example 2 except for the items described below was carried out.

Specifically, the steel foil thus prepared was annealed at 640° C. for 8 hours, whereby a base material 1 having the following characteristic properties was obtained.

Tensile strength (TS): 373 Mpa

Elongation (EL): 16.8%

For the base material 1 obtained as above, the maximum principal strain in uniaxial deformation and the maximum principal strain in planar strain deformation were measured by a technique similar to that in Example 1. As a result of the measurement, the maximum value of the maximum principal strain in uniaxial deformation of the base material 1 in the present comparative example was 0.17. Similarly, the maximum value of the maximum principal strain in planar strain deformation of the base material 1 was 0.13.

The material specifications and evaluation of formability of the samples used in Examples 1 to 9 and Comparative Examples 1 and 2 are set forth in Table 2.

TABLE 2

| | Kind of steel | Carbon content (wt %) | Presence or absence of plating | Base material heat treatment conditions | | Conditions for heat treatment after plating | | Thickness (μm) | TS (MPa) | EL (%) | Maximum principal strain (maximum value) | | | Formability | | Evaluation |
|---|---|---|---|---|---|---|---|---|---|---|---|---|---|---|---|---|
| | | | | Temperature (° C.) | Time | Temperature (° C.) | Time | | | | Uniaxial | Planar strain | Equal biaxial | Rp:1/Rc:3 | Rp:3/Rc:3 | |
| Example 1 | LC | 0.04 | absent | 750 | 10 s | — | — | 50 | 364 | 28.6 | 0.40 | 0.14 | 0.16 | 5 mm or less | 5 to 10 mm | Good |
| Example 2 | ULC | 0.001 | absent | 670 | 8 h | — | — | 50 | 340 | 23.7 | 0.27 | 0.23 | 0.26 | 5 mm or less | 5 to 10 mm | Good |
| Example 3 | ULC | 0.001 | absent | 820 | 20 s | — | — | 80 | 301 | 42.0 | 0.65 | 0.30 | 0.30 | 10 mm or more | 10 mm or more | Excellent |
| Example 4 | ULC | 0.001 | absent | 640 | 8 h | — | — | 80 | 332 | 39.0 | 0.62 | 0.30 | 0.30 | 10 mm or more | 10 mm or more | Excellent |
| Example 5 | ULC | 0.001 | absent | 640 | 8 h | — | — | 50 | 334 | 39.2 | 0.63 | 0.31 | 0.31 | 10 mm or more | 10 mm or more | Excellent |
| Example 6 | ULC | 0.001 | present | — | — | 800 | 10 s | 50 | 325 | 37.3 | 0.62 | 0.30 | 0.32 | 10 mm or more | 10 mm or more | Excellent |
| Example 7 | ULC | 0.001 | present | — | — | 800 | 30 s | 50 | 326 | 35.6 | 0.62 | 0.31 | 0.31 | 10 mm or more | 10 mm or more | Excellent |
| Example 8 | ULC | 0.001 | present | — | — | 820 | 10 s | 50 | 325 | 30.2 | 0.52 | 0.26 | 0.28 | 10 mm or more | 10 mm or more | Excellent |
| Example 9 | ULC | 0.001 | present | — | — | 850 | 10 s | 50 | 339 | 30.7 | 0.54 | 0.28 | 0.28 | 10 mm or more | 10 mm or more | Excellent |
| Comparative Example 1 | ULC | 0.001 | absent | 560 | 8 h | — | — | 50 | 385 | 20.6 | 0.19 | 0.16 | 0.25 | 5 mm or less | 5 mm or less | Poor |
| Comparative Example 2 | ULC | 0.001 | absent | 640 | 8 h | — | — | 50 | 373 | 16.8 | 0.17 | 0.13 | 0.17 | 5 mm or less | 5 mm or less | Poor |

LC . . . Low carbon steel
ULC . . . Ultra low carbon steel

In Examples 1 to 9, the steel foil for battery containers 10 coated with the thermoplastic resin layer 3 was subjected to severe drawing with radii of curvature of not more than predetermined values, and, as a result, it was found out that occurrence of cracking is restrained when the drawn body is produced as a battery container. In addition, according to these results, it was verified that sufficient resistance to the contents can be obtained in use as a non-aqueous battery container.

On the other hand, in Comparative Examples 1 and 2, cracking occurs in the case of drawing with small radii of curvature in production of a battery container, and it may be difficult to obtain sufficient resistance to the contents when the battery container is used as a non-aqueous battery container.

INDUSTRIAL APPLICABILITY

The steel foil for battery containers of the present invention can exhibit sufficient formability and resistance to the contents when used as a container of a non-aqueous battery such as a lithium ion secondary battery, and is applicable to a wide field of industry in which a battery is used.

REFERENCE SIGNS LIST

1: Base material

2: Surface treatment layer

3: Thermoplastic resin layer

10: Steel foil for battery containers

The invention claimed is:

1. Steel foil for battery containers used as a battery container having a base material, wherein the base material is a steel containing less than 10.5% of Cr, a thickness of a base material is 10 to 200 μm, the base material has a C content of 0.001 to 0.01 wt %, a Ti content of 0.01 to 0.1 wt % and an Nb content of 0.001 to 0.05 wt %, and a maximum value of a maximum principal strain in uniaxial deformation is not less than 0.25 and the maximum value of the maximum principal strain in planar strain deformation is not less than 0.1.

2. The steel foil for battery containers according to claim 1, comprising: a surface treatment layer formed on at least one surface thereof.

3. The steel foil for battery containers according to claim 2, wherein the surface treatment layer is either an Ni plating layer in an amount of 0.5 to 50.0 $g/m^2$ or a Cr plating layer in an amount of 0.05 to 10.0 $g/m^2$.

4. The steel foil for battery containers according to claim 1, wherein the maximum value of the maximum principal strain in the uniaxial deformation is not less than 0.45 and the maximum value of the maximum principal strain in the planar strain deformation is not less than 0.2.

5. The steel foil for battery containers according to claim 1, wherein, further, the maximum value of the maximum principal strain in equal biaxial deformation is not less than 0.2.

6. The steel foil for battery containers according to claim 1, wherein the base material has a C content of not more than 0.15 wt %, an Si content of not more than 0.5 wt %, an Mn content of not more than 1.0 wt %, a P content of not more than 0.05 wt %, and an S content of not more than 0.02 wt %.

7. The steel foil for battery containers according to claim 1, comprising:

a thermoplastic resin layer formed on at least one surface thereof.

8. A pouch battery container obtained by heat sealing the steel foil for battery containers according to claim 1.

9. The pouch battery container according to claim 8, wherein the pouch battery container is for non-aqueous batteries.

10. A method of producing steel foil for battery containers according to claim 1, the method comprising an annealing step of annealing a steel foil serving as a base material, wherein in the annealing step, the steel foil is subjected to annealing at 500° C. to less than 750° C. for 5 to 15 hours, or at 750° C. to 900° C. for 5 seconds to 30 minutes.

* * * * *